(12) United States Patent
Miyazaki

(10) Patent No.: US 10,747,096 B2
(45) Date of Patent: Aug. 18, 2020

(54) LIGHT SOURCE UNIT AND PROJECTOR

(71) Applicant: CASIO COMPUTER CO., LTD., Tokyo (JP)

(72) Inventor: Takeshi Miyazaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/438,570

(22) Filed: Jun. 12, 2019

(65) Prior Publication Data

US 2019/0384151 A1 Dec. 19, 2019

(30) Foreign Application Priority Data

Jun. 19, 2018 (JP) .................................. 2018-115858
Jan. 28, 2019 (JP) .................................. 2019-011853
May 23, 2019 (JP) .................................. 2019-096472

(51) Int. Cl.
*G03B 21/20* (2006.01)
*H04N 9/31* (2006.01)
*G03B 33/08* (2006.01)
*G03B 21/00* (2006.01)

(52) U.S. Cl.
CPC .......... *G03B 21/208* (2013.01); *G03B 33/08* (2013.01); *H04N 9/3152* (2013.01); *G03B 21/008* (2013.01)

(58) Field of Classification Search
CPC .............. G03B 21/208; G03B 21/2033; H04N 9/3161; H04N 9/3152; F21Y 2101/00; F21Y 2115/30; F21V 5/043; F21V 5/00

USPC .................................................. 362/331, 335
See application file for complete search history.

(56) References Cited

U.S. PATENT DOCUMENTS

2016/0057397 A1* 2/2016 Kurosaki ............. H04N 9/3111
353/31

FOREIGN PATENT DOCUMENTS

JP 2008-216923 A 9/2008

* cited by examiner

*Primary Examiner* — Ryan D Howard
(74) *Attorney, Agent, or Firm* — Scully Scott Murphy & Presser

(57) ABSTRACT

A light source unit of the present invention includes a light emitting device emitting light having a characteristic in which emitted light travels in a predetermined direction in which a uniformity in intensity distribution relative to an axis of the emitted light is high and an unstable direction in which a uniformity in intensity distribution relative to the axis of the emitted light is lower than that in the predetermined direction, the unstable direction being at right angles to the predetermined direction, an intensity transforming lens formed to control the intensity distribution in the predetermined direction and on which the light emitted from the light emitting device is incident, and a superposition transforming optical device formed to control the intensity distribution in the unstable direction by dividing the intensity distribution into a plurality of directions and superposing divided intensity distributions one on the other.

20 Claims, 9 Drawing Sheets

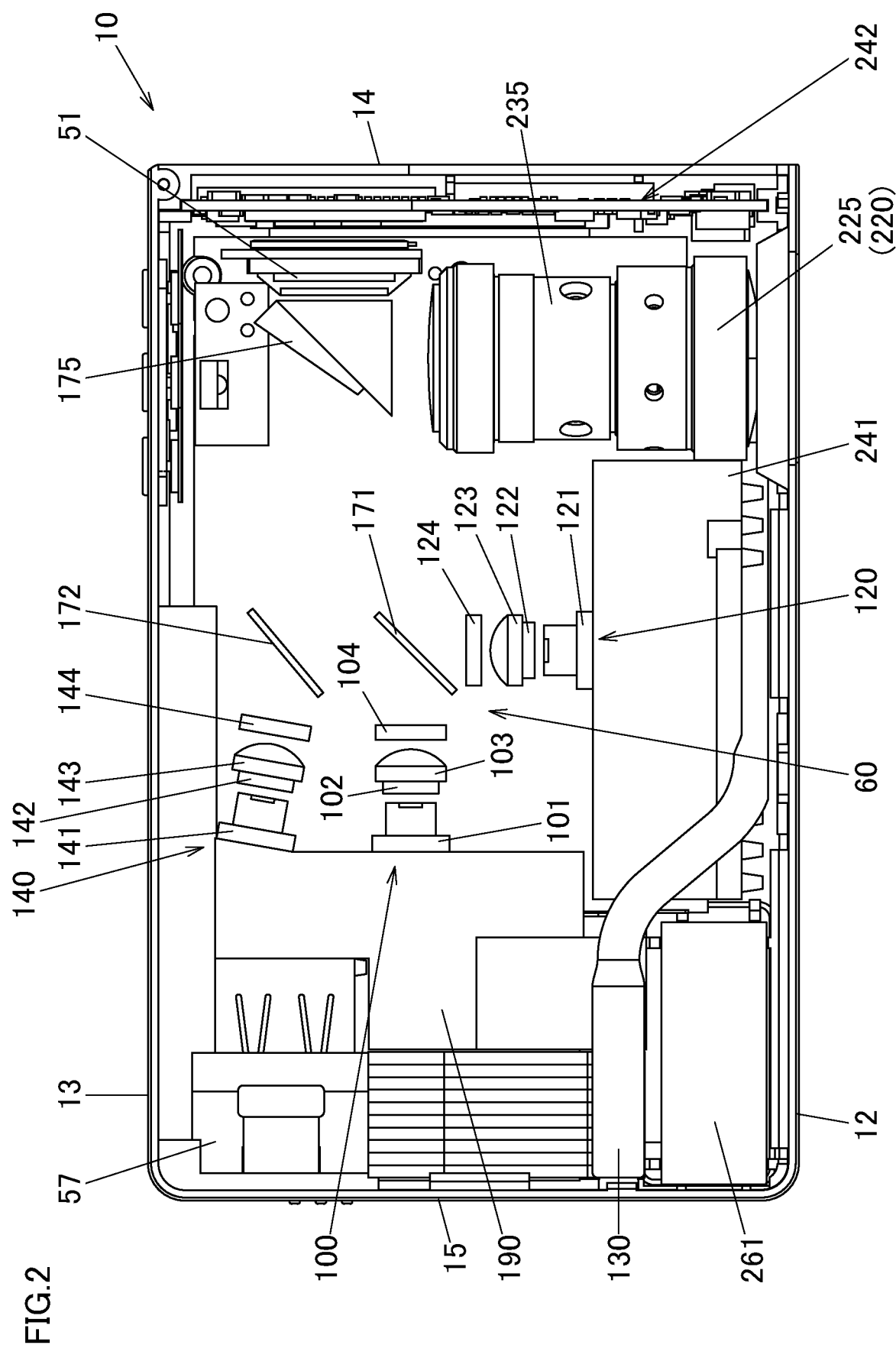

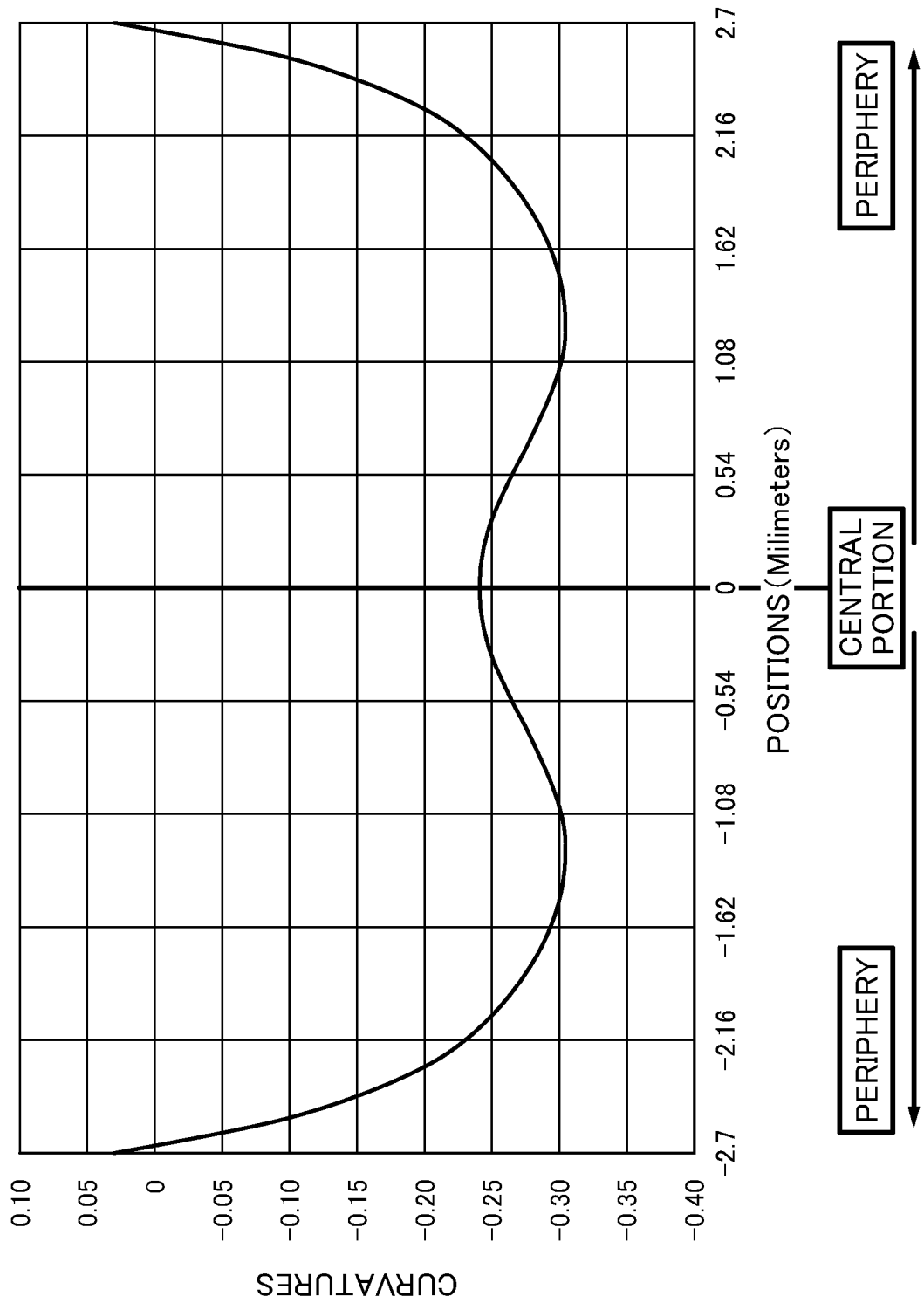

LIGHT SOURCE UNIT AND PROJECTOR

CROSS-REFERENCE TO RELATED APPLICATION

This patent application is based upon and claims the benefit of priority under 35 USC 119 from Japanese Patent Application No. 2018-115858 filed on Jun. 19, 2018 and No. 2019-011853 filed on Jan. 28, 2019 and No. 2019-096472 filed on May 23, 2019, the entire disclosure of which, including the description, claims, drawings, and abstract, is incorporated herein by reference in its entirety.

BACKGROUND OF THE INVENTION

Field of the Invention

The present invention relates to a light source unit and a projector including the light source unit.

Description of the Related Art

Data projectors are widely used on many occasions in these days as an image projector for projecting a screen of a personal computer, a video image, and further, an image based on image data recorded on a memory card or the like onto a screen. In these data projectors, light emitted from a light source is collected onto a micromirror display device called a digital micromirror device (DMD) or a liquid crystal panel to display a color image onto a screen.

Japanese Patent Laid-Open No. 2008-216923 discloses a projector including, as light sources, laser diodes that emit red light, green light, and blue light. Red light, green light, and blue light that are emitted from the red, green, and blue light sources, respectively, are reflected or passed through dichroic mirrors that are disposed individually for those light sources and are then collected to a conical prism. Red light, green light, and blue light that emerge from the conical prism pass through a light tunnel where the red light, green light, and blue light are each transformed into light of a rectangular shape and a uniform luminous intensity (a smoothened luminous intensity distribution) to be shone onto an optical modulator.

As is generally known, a laser beam emitted from a laser diode expands at different angles in a parallel direction ($\theta//$) to a pn junction plane (an active layer) of a semiconductor laser and a right-angle direction ($\theta\perp$) to the pn junction plane of the semiconductor laser and has an elliptic cross-sectional shape (for example, refer to Japanese Patent-Laid Open No. SHO 61-156219).

In relation to the $\theta\perp$ direction, since the laser beam is emitted within the range of a very thin (of the order of ~1 μm) active layer, a diffraction effect acts on the laser beam, whereby the laser diode beam spreads widely, and the $\perp$ direction constitutes a major-axis direction of the ellipse. In relation to the $\theta//$ direction, the laser beams is emitted within a range wider than the range in the $\theta\perp$ direction, and the laser beam spreads less, whereby the $\theta//$ direction constitutes a minor-axis direction of the ellipse.

Then, the intensity distribution of the laser beam so emitted is referred to as a Gaussian distribution. On the other hand, light of a rectangular shape and a uniform luminous intensity (a smoothened luminous intensity distribution) is required for a pencil of light that is shone on to the optical modulator. Then, in the projector of Japanese Patent Laid-Open No. 2008-216923, the light tunnel is used to control the light from the laser diode. However, in the case of a projector including a light tunnel of a predetermined length, it sometimes becomes difficult to make the projector smaller in size.

SUMMARY OF THE INVENTION

The present invention has been made in view of the situations described above, and an object of the present invention is to provide a light source unit that can be made smaller in size and a projector including the light source unit.

According to an aspect of the present invention, there is provided a light source unit including a light emitting device emitting light having a characteristic in which emitted light travels in a predetermined direction in which a uniformity in intensity distribution relative to an axis of the emitted light is high and an unstable direction in which a uniformity in intensity distribution relative to the axis of the emitted light is lower than that in the predetermined direction, the unstable direction being at right angles to the predetermined direction, an intensity transforming lens formed to control the intensity distribution in the predetermined direction and on which the light emitted from the light emitting device is incident, and a superposition transforming optical device formed to control the intensity distribution in the unstable direction by dividing the intensity distribution into a plurality of directions and superposing divided intensity distributions one on the other.

According to another aspect of the invention, there is provided a projector including the light source unit described above, a display device on to which light source light is shone from the light source unit to form image light, a projection optical system configured to project the image light emitted from the display device on to a screen, and a projector control unit configured to control the display device and the light source unit.

BRIEF DESCRIPTION OF THE DRAWINGS

FIG. 2 is a schematic plan view illustrating an internal structure of the projector according to the first embodiment of the present invention;

FIG. 6 is a diagram illustrating a curvature distribution of an intensity transforming lens according to the first embodiment of the present invention.

DETAILED DESCRIPTION OF THE PREFERRED EMBODIMENT

First Embodiment

Figure 1:
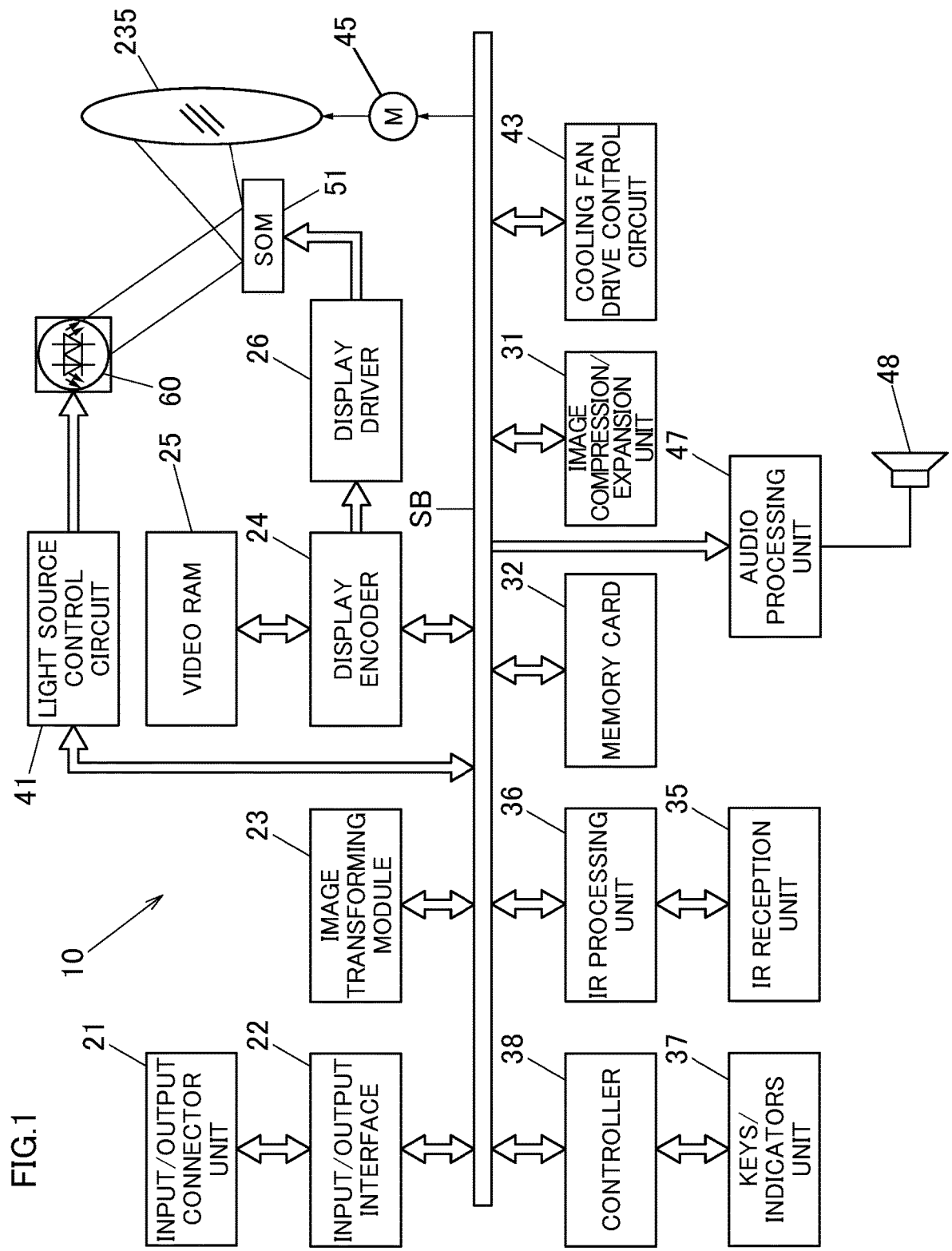
FIG. 1 is a block diagram illustrating functional blocks of a projector according to a first embodiment of the present invention.

Hereinafter, an embodiment according to the present invention will be described based on drawings. FIG. 1 is a block diagram illustrating functional circuit blocks of a projector control unit of a projector 10. The projector control unit includes a controller 38, an input/output interface 22, an image transforming module 23, a display encoder 24, a display driver 26, and the like.

This controller 38 governs the control of operations of individual circuitries inside the projector 10 and includes CPU, ROM storing fixedly operation programs such as various settings, RAM that is used as a work memory, and the like.

Then, the controller 38 sends image signals of various standards which are inputted from an input/output connector unit 21 via the input/output interface 22 and a system bus (SB) to the image transforming module 23, where the image signals are transformed so as to be unified into an image signal of a predetermined format which is suitable for display. Thereafter, the controller 38 outputs the unified image signal to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 functions as a display device controller and drives a display device 51, which is a spatial optical modulator (SOM), at an appropriate frame rate corresponding to the image signal outputted from the display encoder 24.

Then, in the projector 10, pencils of light emitted from a light source unit 60 are shone onto the display device 51 by way of an optical system to form an optical image by reflecting light from the display device 51, and the image so formed is then projected onto a screen, not illustrated, for display by way of a projection-side optical system. A movable lens group 235 of the projection optical system is driven by a lens motor 45 for zooming and focusing.

An image compression/expansion unit 31 performs a recording process in which a luminance signal and a color difference signal of an image signal are data compressed through Adaptive Discrete Cosine Transform (ADCT) and Huffman coding processes, and the compressed data is sequentially written on a memory card 32, which constitutes a detachable recording medium.

Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23 and enables the display of dynamic images based on the image data stored in the memory card 32.

Then, operation signals from a keys/indicators unit 37 including main keys and indicators which are provided on a casing of the projector 10 are sent out directly to the controller 38. Key operation signals from a remote controller are received by an IR reception unit 35 and are then demodulated into a code signal at an Ir processing unit 36 for output to the controller 38.

An audio processing unit 47 is connected to the controller 38 by way of a system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41, which is configured as a light source control unit. The light source control circuit 41 controls individually a red light source device, a green light source device, and a blue light source device of the light source unit 60 so that light in predetermined wavelength ranges is emitted from the light source unit 60 so as to generate an image as required.

Further, the controller 38 causes a cooling fan drive control circuit 43 to detect temperatures through a plurality of temperature sensors which are provided in the light source unit 60 so as to control the revolution speeds of cooling fans based on the results of the temperature detections. Additionally, the controller 38 also causes the cooling fan drive control circuit 43 to keep the cooling fans revolving by use of a timer or the like even after a power supply to a main body of the projector 10 is switched off. Alternatively, the controller 38 causes the cooling fan drive control circuit 43 to cut off the power supply to the main body of the projector 10 depending upon the results of the temperature detections by the temperature sensors.

Next, an internal structure of the projector 10 will be described. FIG. 2 is a schematic plan view illustrating the internal structure of the projector 10. Here, the casing of the projector 10 has a substantially box-like shape and includes an upper and lower panels, a front panel 12, a rear panel 13, a left panel 14, and a right panel 15. In the following description, when left and right are referred to in relation to the projector 10, they denote, respectively, left and right directions with respect to a projecting direction of the projector 10. When front and rear are referred to in relation to the projector 10, they denote, respectively, front and rear directions with respect to the direction of a screen and a traveling direction of a pencil of light from the projector 10.

The projector 10 includes the light source unit 60 in a central portion. The projector 10 includes a lens barrel 225 to the left of the light source unit 60, and this lens barrel 225 constitutes a projection optical system 220 that incorporates a projection optical system. The projector 10 also includes the display device 51 that is disposed parallel to the left panel 14 between the lens barrel 225 and the rear panel 13, the display device 51 being made up of a digital micromirror device (DMD). Further, the projector 10 includes a main control circuit board 241 between the light source unit 60 and the front panel 12 and a power supply control circuit board 242 between the lens barrel 225 and the left panel 14.

Light emitted from the light source unit 60 is shone on to the display device by way of a reverse total internal reflection (RTIR) prism 175. Then, an axis of ON light reflected on the display device 51 is caused to coincide with an optical axis of the projection optical system by the RTIR prism 175 and is then emitted towards the lens barrel 225.

The projector 10 also includes, between the light source unit 60 and the right panel 15, a power supply connector 57, a heat sink 190 configured to cool a green light source 101 and a blue light source 141, which will be described later, a heat pipe 130 configured to guide heat generated in a red light source 121, which will be described later, to the heat sink 190, and a cooling fan 261 configured to blow cooling air against the heat sink 190.

The light source unit 60 includes a blue light source device 140 disposed near the power supply connector 57 and near the rear panel 13, a green light source device 100 disposed on a side of the blue light source device 140 which faces the front panel 12, and a red light source device 120 disposed substantially at a center along a length of the front panel 12 on a side of the green light source device 100 which faces the front panel 12.

The blue light source device 140, which emits light having a wavelength in the blue wavelength range or simply light in the blue wavelength range, includes the blue light source 141, a cylindrical lens array 142, an intensity transforming lens 143 formed to control an intensity distribution of light, and a superposition cylindrical lens (a superposition lens). The blue light source device 140 is disposed in such a manner that light in the blue wavelength range is emitted in the direction of the left panel 14 while sloping sideways towards the front panel 12 rather than towards a direction parallel to the rear panel 13. The blue light source 141 is a laser diode that is a semiconductor light emitting device configured to emit light in the blue wavelength range.

The green light source device 100, which emits light in the green wavelength range, includes the green light source 101, a cylindrical lens array 102, an intensity transforming lens 103, and a superposition cylindrical lens (a superposition lens) 104. The green light source device 100 emits light in the green wavelength range in the direction of the left panel 14 while kept parallel to the rear panel 13. The green light source 101 is a laser diode that is a semiconductor light emitting device configured to emit light in the green wavelength range.

The red light source device 120, which emits light in the red wavelength range, includes the red light source 121, a cylindrical lens array 122, an intensity transforming lens 123, and a superposition cylindrical lens (a superposition lens) 124. The red light source device 120 emits light in the red wavelength range in the direction of the rear panel 13 while kept parallel to the left panel 14. The red light source 121 is a laser diode that is a semiconductor light emitting device configured to emit light in the red wavelength range.

The details of the cylindrical lens arrays 142, 102, 122, the intensity transforming lenses 143, 103, 123, and the superposition cylindrical lenses (the superposition lenses) 144, 104, 124 of the red light source device 140, the green light source device 100, and the red light source device 120 will be described in detail later.

A first dichroic mirror 171 is disposed in a position where light in the green wavelength range from the green light source device 100 intersects light in the red wavelength range from the red light source device 120. The first dichroic mirror 171 reflects light in the green wavelength range and transmits light in the red wavelength range. Consequently, the light in the green wavelength range and the light in the red wavelength range are guided in the direction of the rear panel 13 while an axis of the light in the green wavelength range and an axis of the light in the red wavelength range are caused to coincide with each other.

A second dichroic mirror 172 is disposed in a position where light in the red wavelength range that passes through the first dichroic mirror 171 (in other words, light in the green wavelength range reflected by the first dichroic mirror 171) intersects light in the blue wavelength range from the blue light source device 140. The second dichroic mirror 172 reflects light in the green wavelength range and light in the red wavelength range and transmits light in the blue wavelength range. Consequently, light in the red wavelength range and light in the green wavelength range from the first dichroic mirror 171 and light in the blue wavelength range from the blue light source device 140 are guided towards the RTIR prism 175 lying closer to the left panel 14 while axes of the light in the red wavelength range and the light in the green wavelength range and an axis of the light in the blue wavelength range are caused to coincide with one another. A pencil of light from the light source device 60 that is incident on the RTIR prism 175 is shone on to the display device 51 as described before.

By configuring the projector 10 in the way described heretofore, when light is emitted from the green, red, and blue light source devices at different timings, light in the red wavelength range, light in the green wavelength range, and light in the blue wavelength range are sequentially incident on the RTIR prism 175 and are then shone on to an image forming surface of the display device 51. Then, the DMD, which is the display device 51 of the projector 10, displays the red light, the green light, and the blue light in time division, whereby a color image can be projected on to a screen.

Figure 3A:
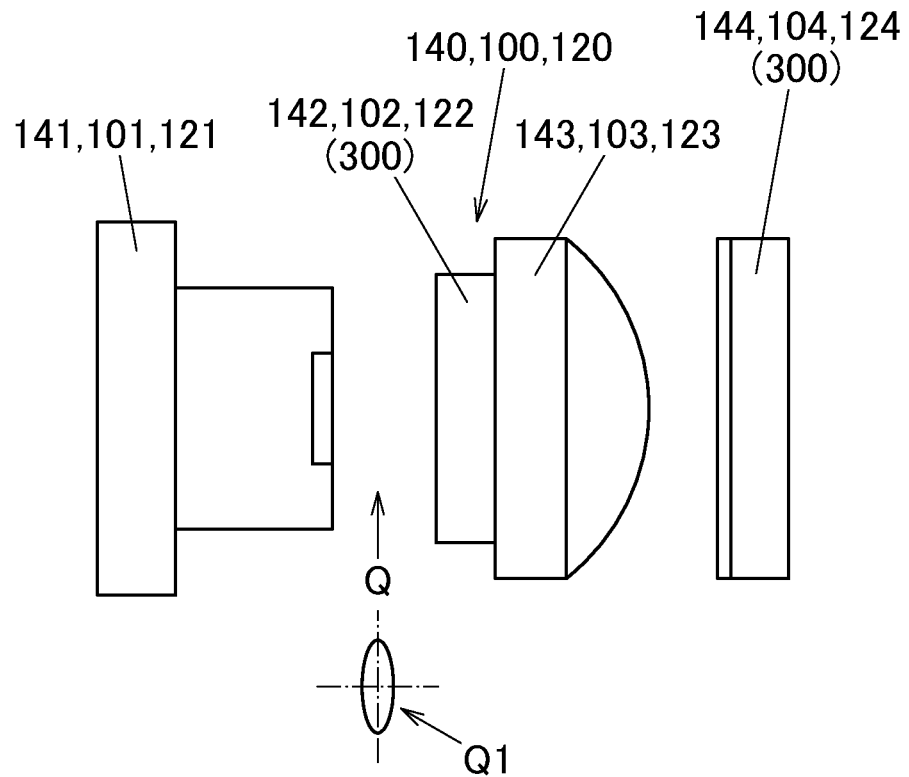
FIG. 3A is a schematic plan view illustrating a layout of red, green, and blue light source devices according to the first embodiment of the present invention in an enlarged fashion.
Figure 3B:
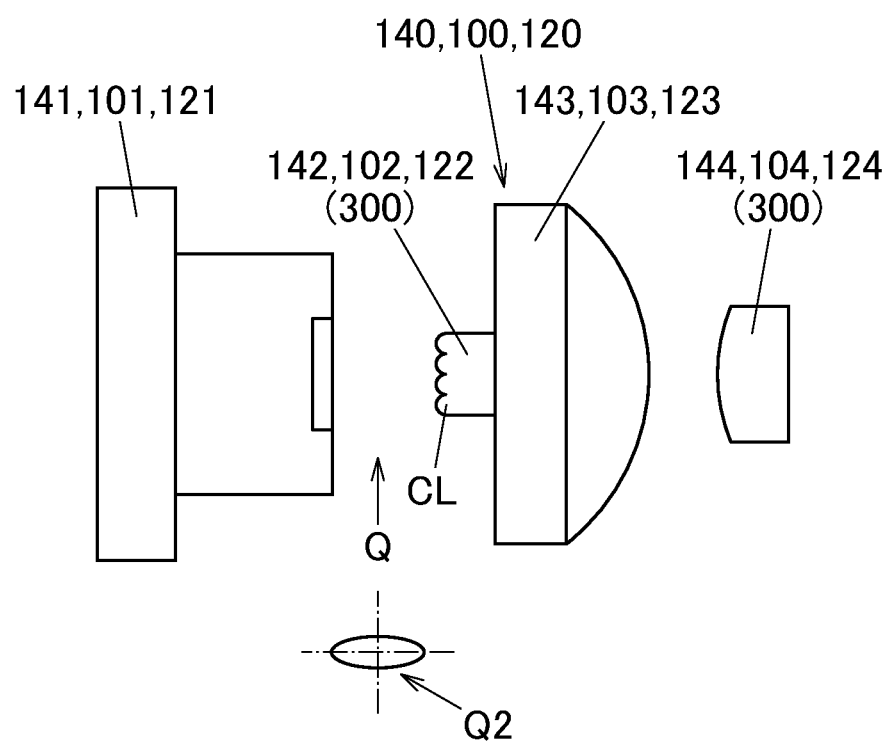
FIG. 3B is a schematic side view of the layout of the red, green, and blue light source devices according to the first embodiment of the present invention in an enlarged fashion.

Here, the cylindrical lens arrays 142, 102, 122, the intensity transforming lenses 143, 103, 123, and the superposition cylindrical lenses (the superposition lenses) 144, 104, 124 of the blue light source device 140, the green light source device 100, and the red light source device 120 will be described in detail. FIG. 3A is a schematic plan view, which is similar to FIG. 2, and FIG. 3B is a schematic side view when seen from the front panel 12. The blue, green, and red light sources 141, 101, 121 are made up of laser diodes that are semiconductor light emitting devices that emit light of an elliptic cross-sectional shape. In a cross-sectional shape of light of each color in a position Q immediately after the light is emitted from each of the blue, green, and red light sources 141, 101, 121, a minor axis constitutes a perpendicular direction to a surface of a sheet of paper on which FIG. 3A is drawn (refer to a cross-sectional shape Q1 of emitted light when seen from an optical axis direction) in FIG. 3A, and in FIG. 3B, a major axis constitutes a perpendicular direction to the sheet of paper on which FIG. 3B is drawn (refer to a cross-sectional shape Q2 of emitted light when seen from the optical axis direction).

Figure 4A:
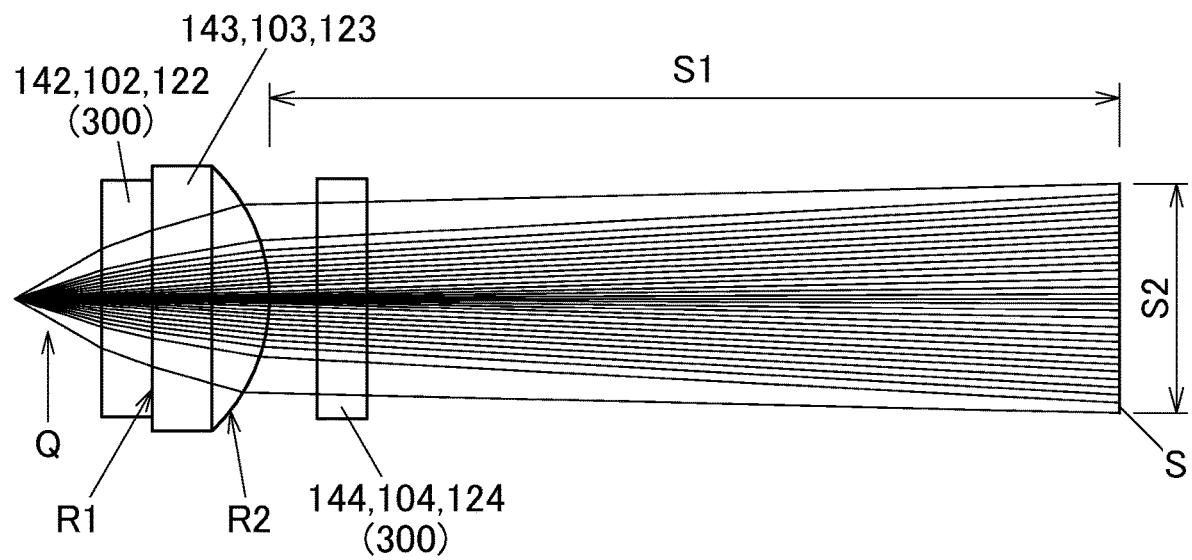
FIG. 4A is a schematic plan view illustrating how the red, green, and blue light source devices according to the first embodiment of the present invention emit light, illustrating from the red, green, and blue light sources to an illumination target plane.
Figure 4B:
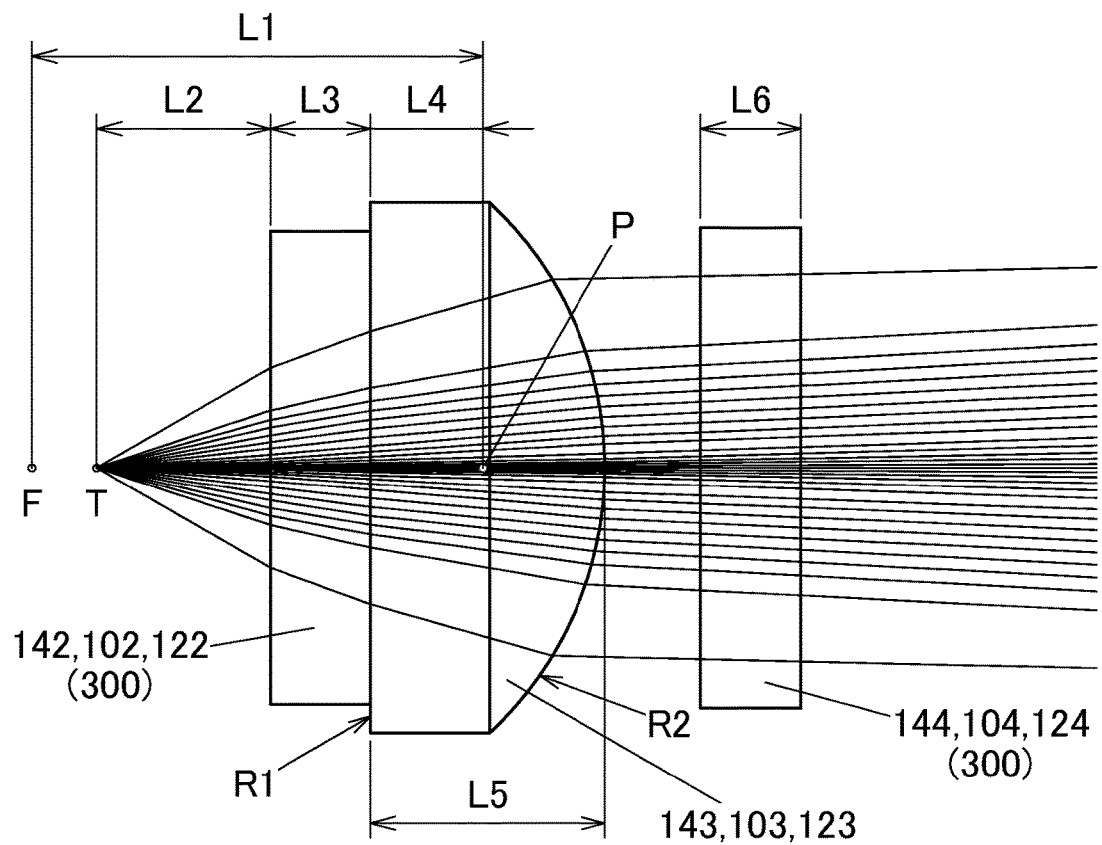
FIG. 4B is a schematic plan view of how the red, green, and blue light source devices according to the first embodiment of the present invention emit light, illustrating the red, green, and blue light source devices in an enlarged fashion.

In FIGS. 2, 3, 4 (which will be described later), the cylindrical lens arrays 142, 102, 122 and the intensity transforming lenses 143, 103, 123 are illustrated as being in contact with each other, but the cylindrical lens arrays 142, 102, 122 and the intensity transforming lenses 143, 103, 123 may be spaced apart from each other.

The cylindrical lens arrays 142, 102, 122 are each formed by combining a plurality of cylindrical lenses CL (refer to FIG. 3B) in a minor axis direction. Each cylindrical lens CL has its curvature in the minor axis direction. The cylindrical lens arrays 142, 102, 122 are disposed in such a manner that their curvature surfaces are directed individually towards the corresponding light source devices.

The intensity transforming lenses 143, 103, 123, which are formed to control an intensity distribution in a major axis direction of light, are lenses that transform a Gauss distribution into a top-hat distribution (a smoothed distribution). In this design example, these intensity transforming lenses are optically designed so that light near a center of the lens travels straight ahead as it is, while light near a circumferential edge of the lens is slightly bent to be substantially parallel to an optical axis of the lens.

Here, the design example of the intensity transforming lenses 143, 103, 123 will be described based on FIG. 4. In FIG. 4, a position S constitutes a position (an illumination target surface) where emitted light is set as rectangular, uniform (smoothed intensity distribution) light, a principal point P constitutes a principal point of each of the intensity transforming lenses 143, 103, 123, a light emitting point T constitutes a light emitting point of each of the laser diodes, and a focal point F constitutes a focal point of each of the intensity transforming lenses 143, 103, 123. In addition, a first refracting surface is denoted as R1, and a second refracting surface is denoted as R2.

Here, firstly, a design example of the intensity transforming lens 143 that defines an optical path of blue light will be described as a representative example. An example of an optical design (lens data) of the intensity transforming lens 143 will be described as below.

Glass material: L-LAH 84 (refractive index $n_d$: 1.80835; Abbe constant $v_d$: 40.55)
Lens thickness: 2.5 mm
Effective diameter: $\phi$ 5.4 mm
Surface R1: Flat surface
Surface R2: Even power polynomial asphere calculated by using Expression (1) and values below
Radius of curvature (R): −4.125 mm
Conic constant (k): −7.328
$\alpha_1$: 0.00E+00
$\alpha_2$: −2.06E-02
$\alpha_3$: 2.59E-03
$\alpha_4$: −2.77E-04
$\alpha_5$: 1.49E-05

[Expression 1]

$$z(y)=cy^2/1+\sqrt{1-(1+k)c^2y^2}+\alpha_1 y^2+\alpha_2 y^4+\alpha_3 y^6+\alpha_4 y^8+\alpha_5 y^{10} \quad (11)$$

Where,
z: Sag amount
y: Distance from optical axis
c: Radius of curvature

The intensity transforming lens 143 designed based on the lens data described above is configured as a planoconvex, rotationally symmetric aspheric lens with an incident surface flat or plane and an emerging one convex, and the emerging surface is configured so that a central portion constitutes a substantially spherical surface and a circumferential edge portion constitutes a curvature varying surface with a smaller curvature than that of the central portion. Then, light in the direction of a major axis of light is incident on the substantially spherical surface at the central portion and the curvature varying surface portion on the circumferential edge portion of the lens, whereas light in the direction of a minor axis of light is incident on the substantially spherical portion at the central portion of the lens. Specifically, with the intensity transforming lens 143 that is designed in the way described above, a layout of the blue light source device 140, which emits light from the blue light source 141 after passing the light sequentially through the cylindrical lens array 142, the intensity transforming lens 143, and the superposition cylindrical lens (the superposition lens) 144, is designed based on the following conditions 1 to 3. Firstly, let's assume that a spread angle of light emitted from the laser diode of the blue light source 141 is $\Theta//$: 5 degrees,
$\Theta\perp$: 20 degrees, as a half angle of an angle at which an intensity of $1/e^2$ (e: base of a natural logarithm) is obtained relative to a peak value of the intensity distribution. Since the intensity transforming lens 143 works so that light of an elliptic cross section that is emitted from the laser diode mainly spreads in a major axis direction, the angle of 20 degrees in the perpendicular direction (Condition 1) is used.

Then, a distance S1 from the intensity transforming lens 143 to the position S is 25 mm (Condition 2), and a length S2 of the emitted light in the major axis direction at the position S is 4 mm (Condition 3). Here, thicknesses L3, L6 of the cylindrical lens array 142 and the superposition cylindrical lens (the superposition lens) 144, which both act as a parallel flat plate in relation to the major axis direction of the emitted light, are both set at 1 mm. In addition, a distance L4 from the surface R1 of the intensity transforming lens 143 to the principal point P is 1.3 mm, and a thickness L5 of the intensity transforming lens 143 is 2.5 mm. Then, the layout of the blue light source device 140 including the intensity transforming lens 143 becomes such that a distance L1 between the principal point P and the focal point F is 5 mm, and a distance L2 between the light emitting point T and the cylindrical lens array 142 is 1.8 mm. In this way, the light emitting point T of the blue light source 141 is positioned closer to the intensity transforming lens 143 than the position of the focal point F for the central portion of the intensity transforming lens 143.

Then, the intensity transforming lenses 103, 123 for the optical paths of green light and red light are designed optimally, as the intensity transforming lens 143 for the optical path of blue light is so designed, based on the wavelength of the color, the spread angle (Condition 1), a distance to the DMD (as illustrated in FIG. 2, distances to the DMD along the optical paths of green light and red light are longer than a distance to the DMD along the optical path of blue light) (Condition 2).

Figure 5A:
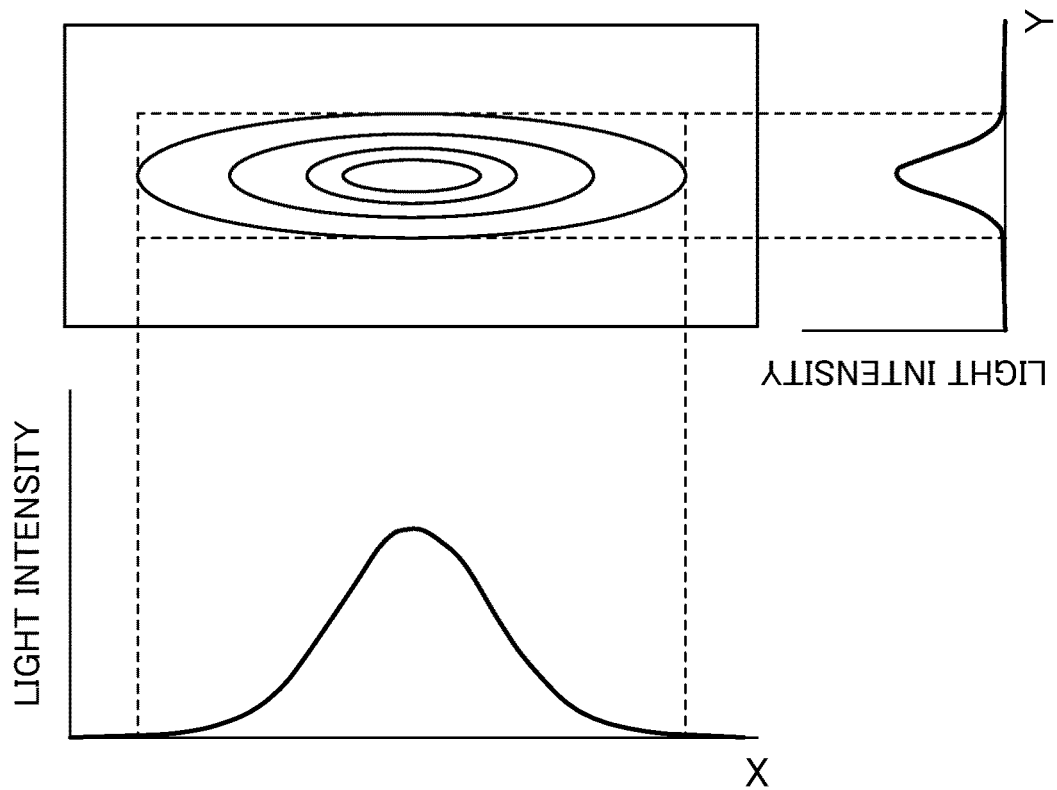
FIG. 5A is a diagram illustrating an intensity distribution of light emitted from the red, green, and blue light source devices according to the first embodiment of the present invention, illustrating an intensity distribution in a position Q in FIG. 4A.
Figure 5B:
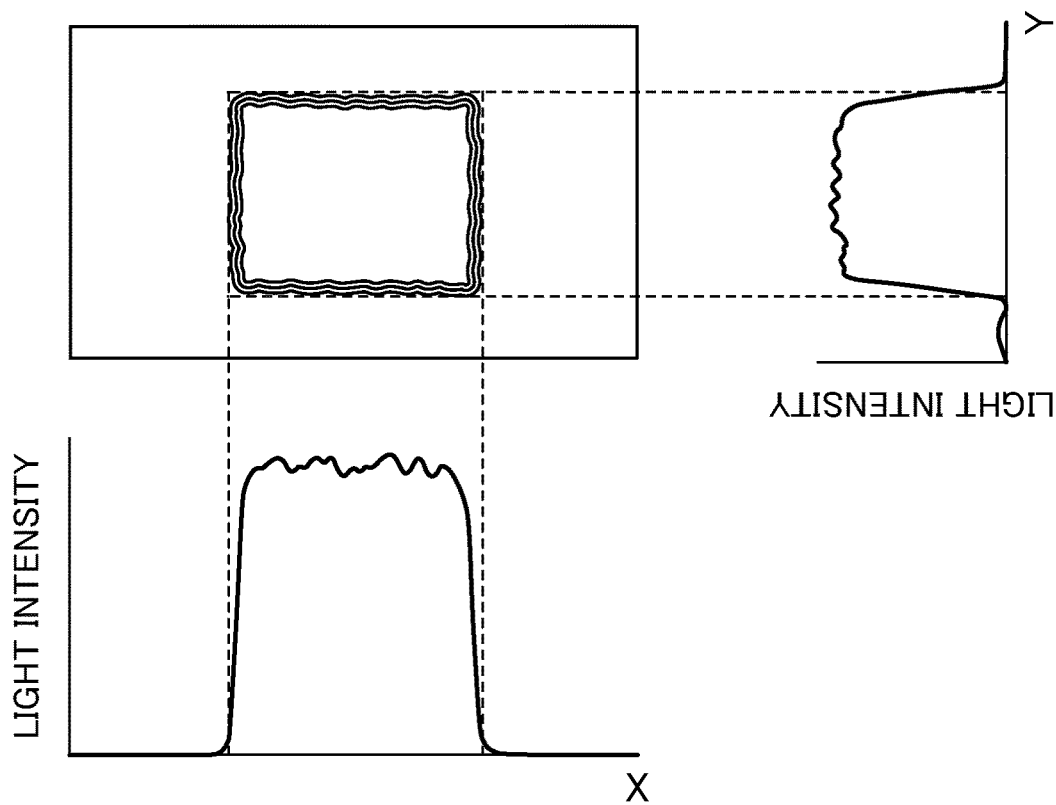
FIG. 5B is a diagram illustrating an intensity distribution of light emitted from the red, green, and blue light source devices according to the first embodiment of the present invention, illustrating an intensity distribution in a position S in FIG. 4A.

Blue light, green light, and red light that are emitted from the blue, green, and red light sources 141, 101, 121, respectively, exhibit a Gauss distribution where a light intensity is high near a center of light as illustrated in FIG. 5A that illustrates a light intensity distribution in the position Q in FIG. 4A. When blue light, green light, and red light that are emitted from the blue, green, and red light sources 141, 101, 121, respectively, are incident on the cylindrical lens arrays 142, 102, 122, pencils of light are each divided into a plurality of directions in a minor axis direction. The pencils of light that are divided into the plurality of directions by the cylindrical lens arrays 142, 102, 122 are each transformed into a top-hat distribution in the major axis direction by the intensity transforming lenses 143, 103, 123. Then, the pencils of light, which are divided into the plurality of directions, emerge from the corresponding intensity transforming lenses 143, 103, 123 and are then superposed one on the other by the superposition cylindrical lenses (the superposition lenses) 144, 104, 124, whereby the pencils of light are also transformed into a top-hat distribution in the minor axis direction. Then, as illustrated in FIG. 5B that illustrates a light intensity distribution in the position S in FIG. 4, blue light, green light, and red light that are emitted from the blue, green and red light sources 141, 101, 121, respectively, are shone as rectangular, uniform (smoothed intensity distribution) light in the position S.

In this way, superposition transforming optical devices 300 are made up of the cylindrical lens arrays 142, 102, 122 and the superposition cylindrical lenses (the superposition lenses) 144, 104, 124, the superposition transforming optical devices 300 being formed to control the intensity distribution of light in the minor axis direction that is at right angles to the major axis by dividing light into a plurality of directions and then superposing them one on the other.

The positions of the light emitting points T of the blue, green, and red light sources 141, 101, 121 are situated nearer to the intensity transforming lenses 143, 103, 123 than the positions of the focal points of the intensity transforming lenses 143, 103, 123. Then, the intensity transforming lenses 143, 103, 123 have a curvature distribution like a curvature distribution illustrated in FIG. 6. In the diagram in FIG. 6 illustrating the curvature distribution, an axis of abscissa denotes positions from a center of an intensity transforming lens, while an axis of ordinate denotes curvatures of the intensity transforming lens at the positions, and the diagram shows that the curvatures approximate to a flat plane as absolute values thereof come closer to 0. It is found from this diagram that the intensity transforming lenses 143, 103, 123 are designed so that the curvature comes closer to 0 as the lens expands from the center towards the periphery. Consequently, the intensity transforming lenses 143, 103, 123 are formed to have a curvature varying surface where a central portion is substantially spherical and the curvature decreases from the central portion towards a spherical portion. In the intensity transforming lenses 143, 103, 123 that are formed in this way, a light ray near the center thereof spreads, whereas a light ray near the circumferential edge thereof is incident on the aspheric surface portion, whereby the light ray is bent intensely to become a light ray that is almost a parallel light ray.

Light emitted from the laser diode is characterized in that a variation in intensity distribution becomes large in a minor axis direction of an elliptic cross section than in a major axis direction and that the intensity distribution in the minor axis direction tends to vary easily. Due to this, as in this embodiment, pencils of light are divided in the minor axis direction by the cylindrical lens array 142, 102, 122, and the pencils of light so divided are superposed one on the other by the superposition cylindrical lenses (the superposition lenses) 144, 104, 124, whereby the variation in intensity distribution of light in the minor axis direction can be compensated for.

Here, when comparing the embodiment of the present invention with a case where light emitted from a laser diode is superposed by a microlens array, in the microlens array, vertical and horizontal ridges exist between microlenses. Consequently, a quantity of light to be lost in the embodiment of the present invention in which the cylindrical lens arrays 142, 102, 122 where ridges exist only in the major axis direction are used becomes a half of a quantity of light to be lost in the comparison example described above.

In addition, with the layout described in this embodiment (the cylindrical lens arrays 142, 102, 122, the intensity transforming lenses 143, 103, 123, and the superposition cylindrical lenses (the superposition lenses) 144, 104, 124 are laid out sequentially from a direction in which blue light, green light, and red light are emitted from the corresponding blue, green, and red light sources 141, 101, 121), the intensity transforming lenses 143, 103, 123 are disposed between the cylindrical lens arrays 142, 102, 122 and the superposition cylindrical lenses (the superposition lenses) 144, 104, 124 between which the layout requires a certain extent of distance to be defined, and therefore, conservation of space can be realized. In addition to the layout of this embodiment, for example, an order can also be adopted in which the intensity transforming lenses 143, 103, 123, the cylindrical lens arrays 142, 102, 122, and the superposition cylindrical lenses (the superposition lenses) 144, 104, 124 are laid out sequentially in that order from the light emitting direction. In this case, blue light, green light, and red light emitted from the intensity transforming lenses 143, 103, 123 are made parallel in relation to the minor axis direction to be incident on the cylindrical lens arrays 142, 102, 122, whereby the optical efficiency is improved.

Additionally, an order may be adopted in which the cylindrical lens arrays 142, 102, 122, the superposition cylindrical lenses (the superposition lenses) 144, 104, 124, and the intensity transforming lenses 143, 103, 123 are laid out sequentially in this order from the light emitting direction.

The intensity transforming lenses 143, 103, 123 are described as being the rotationally symmetric lenses configured to work mainly for light in the major direction of the elliptic cross-sectional shape, but the intensity transforming lenses 143, 103, 123 should be formed to control the intensity distribution in relation to the major axis direction of the light. Thus, the intensity transforming lenses 143, 103, 123 can also be replaced with, for example, lenses of a cylindrical shape having a curvature or convex in the major axis direction.

The superposition lenses 144, 104, 124 are described as having the cylindrical shape having its curvature or convex in the direction of the minor axis direction of light. However, the invention is not limited to this configuration, and hence, the superposition lenses 144, 104, 124 may be lenses having their curvatures in the major axis direction of light. For example, the superposition lenses 144, 104, 124 may also be rotationally symmetrical lenses having the same curvature in the minor axis direction and major axis direction of light or may be lenses having different curvatures in the minor axis direction and the major axis direction of light, for example.

Second Embodiment

Figure 7A:
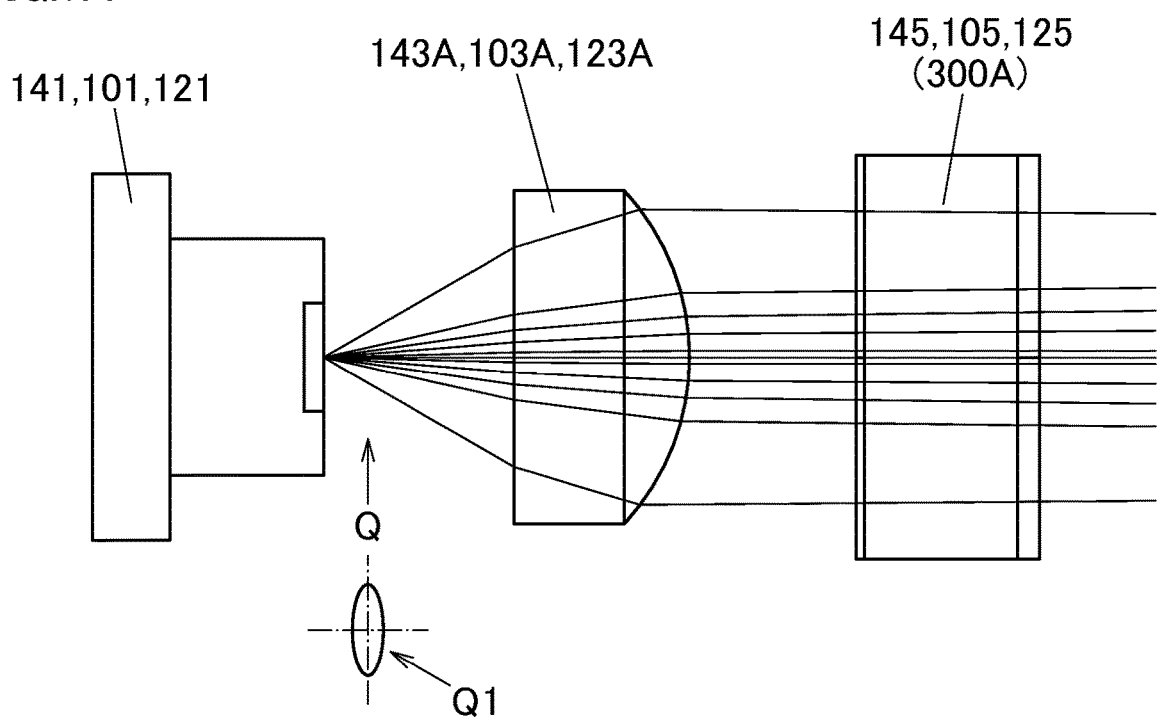
FIG. 7A is a schematic plan view illustrating a layout of a red, green, and blue light source devices according to a second embodiment of the present invention in an enlarged fashion, illustrating how the red, green, and blue light source devices emit light.
Figure 7B:
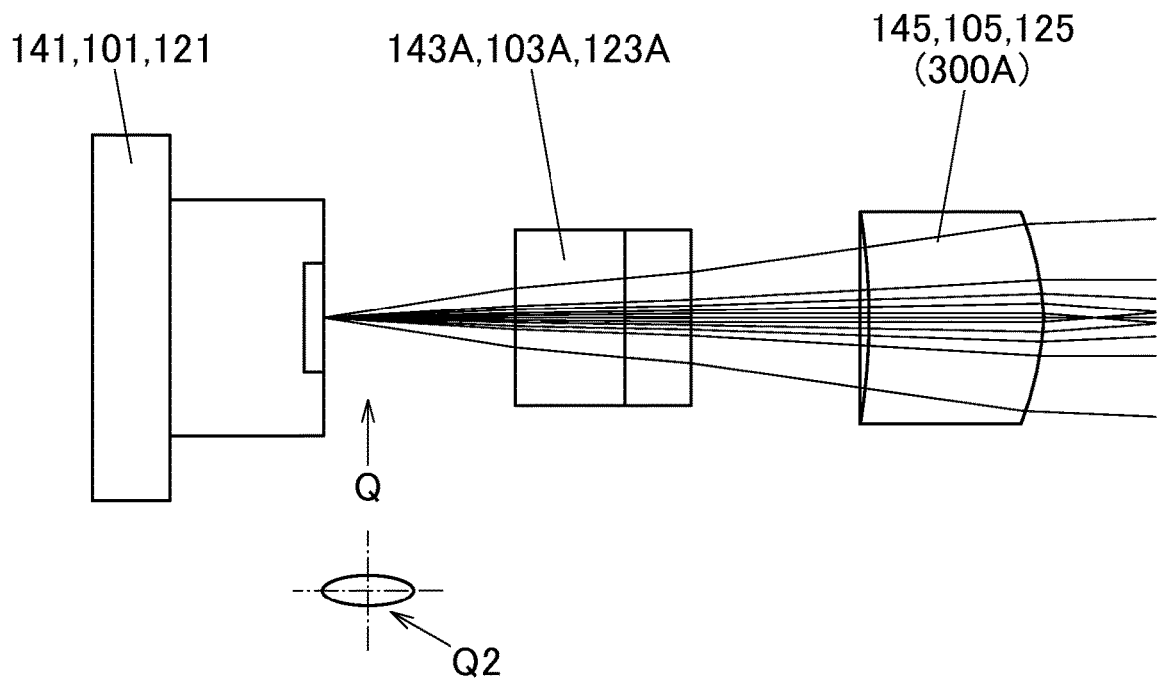
FIG. 7B is a schematic side view illustrating the layout of the red, green, and blue light source devices according to the second embodiment of the present invention in an enlarged fashion, illustrating how the red, green, and blue light source devices emit light.
Figure 8:
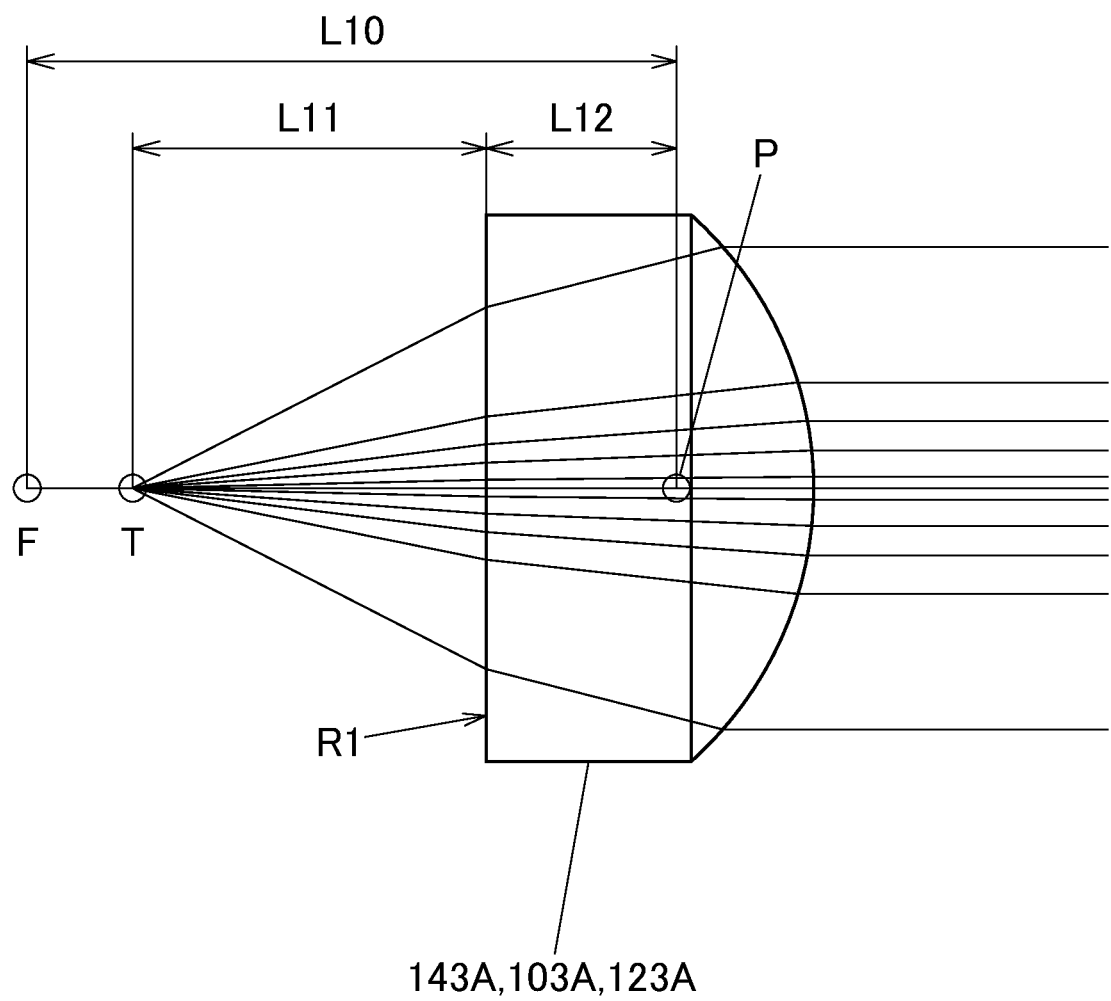
FIG. 8 is a schematic diagram illustrating an intensity transforming lens in each of the red, green, and blue light source devices according to the second embodiment of the present invention.

Next, a second embodiment of the present invention will be described based on FIGS. 7 and 8 that illustrate an optical path using fine lines. In the second embodiment, the superposition transforming optical devices 300 (the cylindrical lens arrays 142, 102, 122, the superposition cylindrical lenses (the superposition lenses) 144, 104, 124) of the blue light source device 140, the green light source device 100, and the red light source device 120 of the first embodiment are replaced with Powell lenses 145, 105, 125 that constitute superposition transforming optical devices 300A, and the intensity transforming lenses 143, 103, 123, which are formed rotationally symmetrical, of the first embodiment are replaced with substantially elongated (cylindrical) intensity transforming lenses 143A, 103A, 123A. As with the description of the first embodiment, a position where light of an elliptic cross-sectional shape passes immediately after the light is emitted from each of blue, green, and red light sources 141, 101, 121 is referred to as a position Q, and in FIG. 6A, a minor axis direction of the elliptic cross section constitutes a direction that is perpendicular to a surface of a sheet of paper on which FIG. 7A is drawn (refer to a cross-sectional shape Q1 of emitted light as seen from an optical axis direction), while in FIG. 7B, a major axis direction of the elliptic cross section constitutes a direction perpendicular to a surface of the sheet of paper on which FIG. 7B is drawn (refer to a cross-sectional shape Q2 of emitted light as seen from an optical axis direction).

The Powell lenses 145, 105, 125 are formed to be elongated in the major axis direction. Incident surfaces of the Powell lenses 145, 105, 125 are formed into a concave surface. Emerging surfaces of the Powell lenses 145, 105, 125 are formed into an aspheric surface. The emerging surfaces of the Powell lenses 145, 105, 125 have a curvature or are convex in the minor axis direction. Specifically, as seen from the major axis direction (refer to FIG. 7B), the Powell lenses 145, 105, 125 have a substantially triangular shape whose apex is directed towards a light emitting direction, and side portions of the substantially triangular shape are made convex outwards.

The intensity transforming lenses 143A, 103A, 123A, which are formed to control the intensity distribution in the major axis direction of light, are formed substantially elongated in the major axis direction. In the intensity transforming lenses 143A, 103A, 123A, an incident surface is formed flat, while an emerging surface is formed to have a curvature or be convex in the major axis direction. As in the intensity transforming lenses 143, 103, 123 of the first embodiment, the intensity transforming lenses 143A, 103A, 123A are optically designed so that light near a center of the lens travels straight ahead as it is to spread, while light near a circumferential edge of the lens is bent slightly to be substantially parallel to an optical axis of the lens in relation to the major axis direction of light.

A design example of the intensity transforming lens 143A that defines an optical path of blue light will be described as a representative example together with FIG. 8, using Expression 1 described above. An example of an optical design (lens data) of the intensity transforming lens 143A will be described as below.

Glass material: L-LAM 60 (refractive index $n_d$: 1.7432; Abbe constant $v_d$: 49.29)
Lens thickness: 2.0 mm
Effective diameter: φ 3.6 mm
Surface R1: Flat surface
Surface R2: Even power polynomial asphere calculated by using Expression (1) and values below
Radius of curvature (R): −2.808 mm
Conic constant (k): −1.05E+00
$α_1$: 0.00E+00
$α_2$: −1.40E-02
$α_3$: 2.29E-03
$α_4$: −2.79E-04
$α_5$: 8.70E-06

Figure 9:
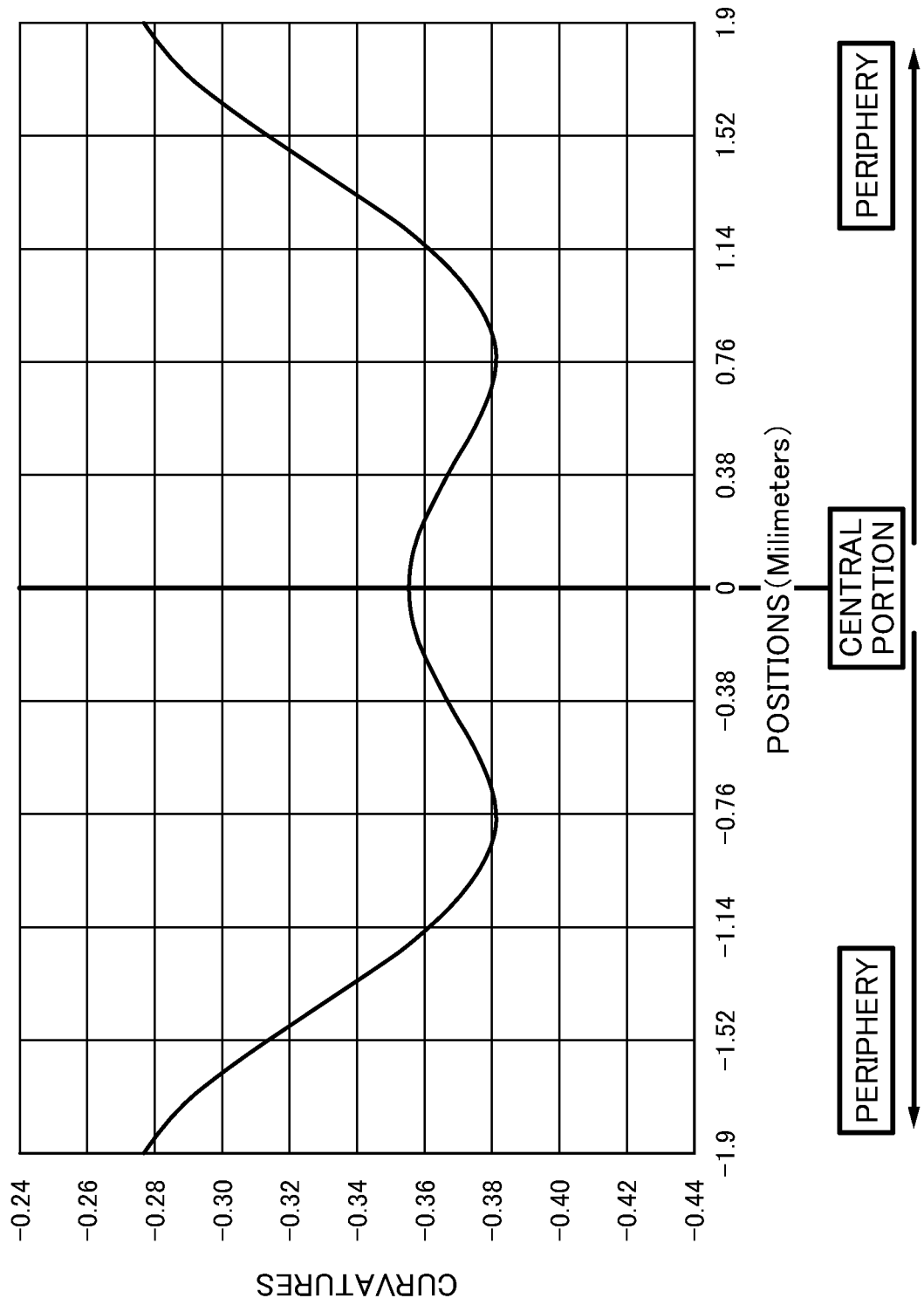
FIG. 9 is a diagram illustrating a curvature distribution of an intensity transforming lens according to a second embodiment of the present invention.

The intensity transforming lens 143A designed based on the lens data described above has a shape in which an incident surface is flat or plane, while an emerging surface is convex. Then, FIG. 9 illustrates a change in curvature on the convex surface. As illustrated in FIG. 9, since the intensity transforming lens 143A is designed so that the curvature approaches 0 as it expands towards a periphery, a light ray spreads near a center, while a light ray near the periphery is incident on an aspheric surface and is bent strongly into a light ray that is almost parallel. In this way, the intensity transforming lens 143A is formed to have a curvature varying surface where a central portion is substantially spherical and the curvature becomes smaller at a peripheral portion than at the central portion. In addition, as an optical path is indicated by fine lines in FIG. 7A, light in a major axis direction of light is incident on the central portion and the curvature varying surface portion at the circumferential edge portion of the lens, and light in a minor axis direction of light is incident on the lens as it is.

Specifically, a spread angle of 20 degrees in the major axis direction (the perpendicular direction) of the laser diode (Condition 1) is used, and as with the first embodiment (refer to FIG. 4A), a distance S1 from the intensity transforming lens 143A to a position S is 25 mm (Condition 2), and a length S2 of the emitted light in the major axis direction at the position S is 4 mm (Condition 3). Here, as illustrated in FIG. 8, a distance L12 from a surface R1 of the intensity transforming lens 143A to a principal point P is 1.1 mm, and a distance L10 from the principal point P to a focal point F is 3.8 mm. Then, a layout of the blue light source device 140 including the intensity transforming lens 143A is such that a distance L11 from a light emitting point T to the surface R1 is 2.2 mm. In this way, the light emitting point T of a blue light source 141 is positioned closer to the intensity transforming lens 143A than the focal point F of the intensity transforming lens 143A. The intensity transforming lenses 103A, 123A are also optically designed in the same way.

In light emitted from the intensity transforming lenses 143A, 103A, 123A, light in the minor axis direction is spread in the minor axis direction on incident surfaces of the Powell lenses 145, 105, 125 as illustrated in FIG. 7B. The light that is incident on and is spread by the Powell lenses 145, 105, 125 is divided into two directions of an upward and downward directions from an apex of a substantially triangular shape as a boundary and is then superposed one on the other on an illumination target surface.

Consequently, as illustrated in FIG. 5A illustrating the first embodiment, blue light, green light, and red light emitted from the blue, green, and red light sources 141, 101, 121, respectively, that exhibit a light intensity distribution of a Gauss distribution (refer to FIG. 5A) in the position Q are transformed into a top-hat distribution via the intensity transforming lenses 143A, 103A, 123A and the Powell lenses 245, 105, 125 and are then shone onto the illumination target surface (the position S, refer to FIG. 4A).

In this embodiment, the intensity transforming lenses 143A, 103A, 123A are separated from the Powell lenses 145, 105, 125, respectively, but the intensity transforming lenses 143A, 103A, 123A may be formed integrally with the Powell lenses 145, 105, 125, respectively. The emerging sides of the Powell lenses 145, 105, 125 are formed into the substantially triangular shape, but on the contrary to this embodiment, incident surfaces of the Powell lenses 145, 105, 125 may be formed into a substantially triangular shape, and surfaces of the emerging sides thereof may be formed into a concave surface. Additionally, the concave incident surfaces of the Powell lenses 145, 105, 125 of this embodiment can be made flat or plane.

In the embodiments described above, the light emitting devices are described as being made up of the laser diode.

In the laser diode, there exists one single peak in the θ⊥ direction, while the θ// direction is in the multi-mode, and hence, there exist a plurality of peaks. Each peak constitutes an oscillation mode of the laser diode, and a ratio of each peak varies depending upon the driving conditions or degree of deterioration, causing an unstable state.

In relation to the θ⊥ direction (the major axis direction), since the thickness of the active layer is so thin as to be of the order of 1 μm, whereby a plurality of modes cannot exist, the uniformity in distribution is stable (the uniformity is high).

In relation to the θ// direction (the minor axis direction), the width of the light emitting device ranges from several tens of μm to several hundreds of μm and is hence wider extraordinarily than in the θ⊥ direction. Due to this, current values or temperatures differ locally. Then, the light emitting position/refractive index of semiconductor/defect in crystal varies locally, as a result of which the ratio of each peak varies, and the uniformity in distribution becomes unstable (the uniformity is low).

Consequently, in the embodiments described above, light in the θ// direction (the major axis direction) constitutes light in the stable direction (a predetermined direction) and is transformed into the top-hat distribution by the intensity transforming lens, whereas light in the θ⊥ direction (the minor axis direction) constitutes light in the unstable direction and is transformed into the top-hat distribution by the superposition transforming optical device. On the contrary, in the case of a light emitting device where light in a minor axis direction constitutes light in a stable direction, while light in a major axis direction constitutes light in a stable direction, the light in the minor axis direction should be transformed into a top-hat distribution by the intensity transforming lens, whereas the light in the major axis direction should be transformed into a top-hat distribution by the superposition transforming optical device.

The distribution of light is not limited to the elliptic shape, and hence, the distribution of light may be a circular distribution or a distribution of any other shape.

When referred to herein, the unstable uniformity in intensity distribution (the low uniformity in intensity distribution) means various intensity distributions including an intensity distribution of a collapsed Gauss distribution and an intensity distribution where the number of peaks varies, whether the intensity distribution is symmetrical or asymmetrical.

In any case, in the light emitting device that emits light having the characteristics in which the uniformity in intensity distribution of emitted light relative to the axis of the emitted light differs between the predetermined direction and the direction at right angles to the predetermined direction, light in the direction in which the uniformity is stable (high) is transformed into the top-hat distribution by the intensity transforming lens, whereas light in the direction in which the uniformity is unstable (low) is transformed into the top-hat distribution by the superposition transforming optical device. As a result of this configuration, the rectangular illumination light whose intensity distribution is transformed into the top-hat distribution can be realized with good efficiency.

Thus, the light source unit 60 includes the green, blue, and red light sources 141, 101, 121 that constitutes the light emitting devices that emit light having the characteristics in which the emitted light travels in the predetermined direction in which the uniformity in intensity distribution relative to the axis of the emitted light is high and in the direction at right angles to the predetermined direction in which the uniformity in intensity distribution relative to the axis the emitted light is low, the intensity transforming lenses 143, 103, 123, 143A, 103A, 123A that are formed to control the intensity distribution in the predetermined direction and on which the emitted light is incident, and the superposition transforming optical devices 300, 300A (the combinations of the cylindrical lens arrays 142, 102, 122 and the superposition cylindrical lenses (the superposition lenses) 144, 104, 124, or the Powell lenses 145, 105, 125) that are formed to control the intensity distribution in the unstable direction by dividing the intensity distribution in the unstable direction into the plurality of directions and superposing the divided intensity distributions.

As a result, even though the laser diodes are used as the light emitting devices, emitted light can be formed into rectangular illumination light in which the Gauss distribution is transformed into the top-hat distribution. Consequently, the light source unit can be provided which is made small in size without using a relatively large optical member such as a light tunnel and a microlens array.

The superposition transforming device 300 includes the cylindrical lens arrays 142, 102, 122 in each of which the plurality of cylindrical lenses that are convex in the unstable direction are combined together in the unstable direction, and the superposition cylindrical lenses (the superposition lenses) 144, 104, 124 that superpose light from the cylindrical lens arrays 142, 102, 122 and shine the superposed light on to the shining target surface. As a result, the number of divisions of light intensity distribution in the unstable direction can be increased, whereby the superposition transforming device 300 can be configured as the optical system that is good enough to deal with variation in light intensity distribution.

In the intensity transforming lenses 143, 103, 123, the curvature at the circumferential edge portion is smaller than that at the central portion in the stable direction of light. As a result, the intensity distribution can be controlled by refracting light passing through the circumferential edge portion more largely than light passing through the central portion.

The intensity transforming lenses 143, 103, 123 are formed as the planoconvex, rotationally symmetric aspheric lenses. As a result, the cost involved in manufacture can be reduced more than when forming them of cylindrical lenses.

Additionally, in the intensity transforming lenses 143, 103, 123, the central portion is formed into the substantially spherical surface, and the circumferential edge portion is formed into the curvature varying surface with the smaller curvature than that at the central portion. Light in the stable direction is incident on the central portion and the circumferential edge portion, while light in the unstable direction incident on the central portion. As a result, light can be produced in which the intensity distribution in the major axis direction is transformed into the top-hat distribution by controlling the intensity distribution in the major axis direction.

Light emitted from the blue, green, and red light sources 141, 101, 121 is incident on the cylindrical lens arrays 142, 102, 122, light emerging from the cylindrical lens arrays 142, 102, 122 is incident on the intensity transforming lenses 143, 103, 123, and light emerging from the intensity transforming lenses 143, 103, 123 is incident on the superposition cylindrical lenses (the superposition lenses) 144, 104, 124. As a result, the blue, green, and red light source devices 140, 100, 120 can be formed compact in size.

Light emitted from the blue, green, and red light sources 141, 101, 121 may be incident on the intensity transforming lenses 143, 103, 123, light emerging from the intensity transforming lenses 143, 103, 123 may be incident on the cylindrical lens arrays 142, 102, 122, and light emerging from the cylindrical lens arrays 142, 102, 122 may be incident on the superposition cylindrical lenses (the superposition lenses) 144, 104, 124. As a result, the blue, green, and red light sources 140, 100, 120 can be provided whose light using efficiency is improved.

The cylindrical lenses that have the curvature or are convex in the unstable direction are adopted for the superposition cylindrical lenses (the superposition lenses) 144, 104, 124. As a result, the superposition cylindrical lenses (the superposition lenses) 144, 104, 124 can be designed to work only in the unstable direction, whereby the optical design can be facilitated.

The superposition transforming optical device 300A includes the Powell lens 145, 105, 125 that has the curvature or is convex in the unstable direction. As a result, the illumination light in which the Gauss distribution is transformed into the top-hat distribution can be produced by the intensity transforming lens 143A, 103A, 123A and the Powel lens 145, 105, 125, whereby the light source unit can be made small in size.

The emerging surface of the Powell lens 145, 105, 125 can be formed into the aspheric surface. As a result, the light intensity distribution can be transformed into the intensity distribution resembling the top-hat configuration.

Additionally, the incident surface of the Powel lens 145, 105, 125 can be formed into the concave surface. As a result, light in the minor axis direction can be spread.

The positions of the light emitting points T of the blue, green, and red light sources 141, 101, 121 are located closer to the intensity transforming lenses 143, 103, 123 than the positions of the focal points of the intensity transforming lenses 143, 103, 123. As a result, the light intensity distribution of light emitted from the laser diode, which constitutes the Gauss distribution, can be transformed into the top-hat distribution.

The projector 10 includes the light source unit 60, the display device 51, the projection optical system 220, and the projector control unit. As a result, illumination light whose light intensity distribution is transformed into the top-hat distribution can be used while using the laser diode constituting the bright light emitting device as the light source, whereby the projector 10 can be provided which is made small in size.

While the embodiments of the present invention have been described heretofore, the embodiments are presented as examples, and hence, there is no intention to limit the scope of the present invention by the embodiments. These novel embodiments can be carried out in other various forms, and various omissions, replacements and modifications can be made to the embodiments without departing from the spirit and scope of the invention. Those resulting embodiments and their modifications are included in the spirit and scope of the present invention and are also included in the scope of inventions claimed for patent under claims below and their equivalents.

What is claimed is:

1. A light source unit, comprising:
   a light emitting device emitting light having a characteristic in which emitted light travels in a predetermined direction in which a uniformity in intensity distribution relative to an axis of the emitted light is high and an unstable direction in which a uniformity in intensity distribution relative to the axis of the emitted light is lower than that in the predetermined direction, the unstable direction being at right angles to the predetermined direction;
   an intensity transforming lens formed to control the intensity distribution in the predetermined direction and on which the light emitted from the light emitting device is incident; and
   a superposition transforming optical device formed to control the intensity distribution in the unstable direction by dividing the intensity distribution into a plurality of directions and superposing divided intensity distributions one on the other.

2. The light source unit according to claim 1,
   wherein the superposition transforming optical device comprises:
   a cylindrical lens array in which a plurality of cylindrical lenses each having a curvature in the unstable direction are combined together in the unstable direction; and
   a superposition lens configured to superpose light from the cylindrical lens array and shine the superposed light on to an illumination target surface.

3. The light source unit according to claim 2,
   wherein the intensity transforming lens is such that a curvature at a circumferential edge portion is smaller than a curvature at a central portion in the predetermined direction.

4. The light source unit according to claim 2,
   wherein the intensity transforming lens is a planoconvex, rotationally symmetrical aspheric lens.

5. The light source unit according to claim 3,
   wherein the intensity transforming lens is a planoconvex, rotationally symmetrical aspheric lens.

6. The light source unit according to claim 3,
   wherein the intensity transforming lens is such that a central portion is formed into a substantially spherical surface, and a circumferential edge portion is formed into a curvature varying surface whose curvature is smaller than a curvature of the central portion, and
   wherein light in the predetermined direction is incident on the central portion and the circumferential edge portion of the intensity transforming lens, and light in the unstable direction is incident on the central portion of the intensity transforming lens.

7. The light source unit according to claim 4,
   wherein the intensity transforming lens is such that a central portion is formed into a substantially spherical surface, and a circumferential edge portion is formed into a curvature varying surface whose curvature is smaller than a curvature of the central portion, and
   wherein light in the predetermined direction is incident on the central portion and the circumferential edge portion of the intensity transforming lens, and light in the unstable direction is incident on the central portion of the intensity transforming lens.

8. The light source unit according to claim 5,
   wherein the intensity transforming lens is such that a central portion is formed into a substantially spherical surface, and a circumferential edge portion is formed into a curvature varying surface whose curvature is smaller than a curvature of the central portion, and
   wherein light in the predetermined direction is incident on the central portion and the circumferential edge portion of the intensity transforming lens, and light in the unstable direction is incident on the central portion of the intensity transforming lens.

9. The light source unit according to claim 3,
   wherein light emitted from the light emitting device is incident on the cylindrical lens array,
   wherein light emerging from the cylindrical lens array is incident on the intensity transforming lens, and wherein light emerging from the intensity transforming lens is incident on the superposition lens.

10. The light source unit according to claim 4,
wherein light emitted from the light emitting device is incident on the cylindrical lens array,
wherein light emerging from the cylindrical lens array is incident on the intensity transforming lens, and
wherein light emerging from the intensity transforming lens is incident on the superposition lens.

11. The light source device according to claim 3,
wherein light emitted from the light emitting device is incident on the intensity transforming lens,
wherein light emerging from the intensity transforming lens is incident on the cylindrical lens array, and
wherein light emerging from the cylindrical lens array is incident on the superposition lens.

12. The light source device according to claim 4,
wherein light emitted from the light emitting device is incident on the intensity transforming lens,
wherein light emerging from the intensity transforming lens is incident on the cylindrical lens array, and
wherein light emerging from the cylindrical lens array is incident on the superposition lens.

13. The light source unit according to claim 2,
wherein the superposition lens has a cylindrical shape that has a curvature in the unstable direction.

14. The light source unit according to claim 3,
wherein the superposition lens has a cylindrical shape that has a curvature in the unstable direction.

15. The light source unit according to claim 1,
wherein the superposition transforming optical device comprises a Powell lens having a curvature in the unstable direction.

16. The light source unit according to claim 15,
wherein an emerging surface of the Powell lens is an aspheric surface.

17. The light source unit according to claim 15,
wherein an incident surface of the Powell lens is a concave surface.

18. The light source unit according to claim 16,
wherein an incident surface of the Powell lens is a concave surface.

19. The light source unit according to claim 1,
wherein a light emitting point of the light emitting device is positioned closer to the intensity transforming lens than a position of a focal point of the intensity transforming lens.

20. A projector, comprising:
the light source unit according to claim 1;
a display device on to which light source light is shone from the light source unit to form image light;
a projection optical system configured to project the image light emitted from the display device on to a screen; and
a projector control unit configured to control the display device and the light source unit.

\* \* \* \* \*